United States Patent [19]
Tanabe et al.

[11] Patent Number: 5,705,906
[45] Date of Patent: Jan. 6, 1998

[54] ROBOT TEACHING PENDANT

[75] Inventors: Yoshikiyo Tanabe, Fujiyoshida; Yoshiki Hashimoto, Hadano, both of Japan

[73] Assignee: FANUC Ltd, Minamitsuru-gun, Japan

[21] Appl. No.: 558,753

[22] Filed: Nov. 20, 1995

[30] Foreign Application Priority Data

Dec. 15, 1994 [JP] Japan .................................. 6-311587

[51] Int. Cl.$^6$ ...................................... B25J 9/22
[52] U.S. Cl. .................. 318/568.13; 318/568.13; 318/568.2; 318/567; 395/99; 395/84
[58] Field of Search ...................... 318/568.13, 568.2, 318/568.25, 569, 568.11, 568.1, 567; 901/3, 49, 50; 364/188, 184, 474.01; 414/730; 395/99, 84

[56] References Cited

U.S. PATENT DOCUMENTS

| | | | |
|---|---|---|---|
| 4,700,118 | 10/1987 | Kishi et al. | 318/568 |
| 5,079,491 | 1/1992 | Nose et al. | 318/568.11 |
| 5,248,341 | 9/1993 | Berry, Jr. et al. | 901/3 |
| 5,363,474 | 11/1994 | Sarugaku et al. | 395/99 |
| 5,369,346 | 11/1994 | Takahashi et al. | 901/3 |
| 5,403,319 | 4/1995 | Matsen, III et al. | 364/188 |
| 5,404,290 | 4/1995 | Tsuchihashi et al. | 364/184 X |

*Primary Examiner*—Karen Masih
*Attorney, Agent, or Firm*—Staas & Halsey

[57] ABSTRACT

A robot teaching pendant having improved operability achieved by being provided with a display function for a personal computer. The robot teaching pendant includes an emergency stop switch and a deadman switch necessary to secure the safety of an operator, and a jog key switch necessary for a teaching operation. The robot teaching pendant further includes a liquid crystal display unit for displaying an image signal supplied from a graphical (CRT) interface of the personal computer, whereby the robot teaching pendant not only serves as a display unit for the personal computer but also realizes an easy to operate display using the graphical user interface of the personal computer when a teaching operation and the like are carried out.

11 Claims, 2 Drawing Sheets

ROBOT TEACHING PENDANT

BACKGROUND OF THE INVENTION

1. Field of the Invention

The present invention relates to a robot teaching pendant, and more specifically, to a robot teaching pendant needed when a robot system is arranged in combination with a personal computer.

2. Description of the Related Art

A conventional robot system includes a robot main body, a robot controller for controlling the robot main body and a teaching pendant through which an operator teaches his intended operation to the robot controller. The teaching pendant is extended from the robot controller by a cable and the operator carries out a teaching operation through the teaching pendant held by his hand while observing the operation of the robot. At the time, the operator puts the robot into operation while depressing a deadman switch disposed on the teaching pendant and carries out the teaching operation by operating, for example, a jog key switch. If the robot in a stationary state unintentionally starts its operation by any chance and approaches the operator or if the operator senses imminent danger due to unexpected operation of the robot, he releases the teaching pendant, that is, he stops the robot by releasing the depression of the deadman switch to secure his safety. Further, the teaching pendant is provided with a liquid crystal display unit to enable the operator to get the information of the robot at hand, so that the operator can carry out all the operations such as the confirmation of robot operation and the like also through the teaching pendant.

Recently, a personal computer has been connected to a conventional robot system so that the personal computer displays a state of a robot, creates a program for the robot and controls peripheral units other than the robot.

In the robot system added with the personal computer, however, a display unit is provided with each of the teaching pendant and the personal computer. The handy teaching pendant which can be operated while it is carried by the operator is usually provided with a small display unit and, therefore, its display capability is limited. On the other hand, the personal computer has no problem in the display of information. However, when it is used in place of a teaching pendant, a problem occurs with regard to safety, operability and portability. Because the personal computer does not include an emergency stop switch, a deadman switch for securing the safety of the operator, or a jog key switch for effectively carrying out a teaching operation, it cannot be used for a teaching job.

SUMMARY OF THE INVENTION

An object of the present invention is to provide a robot teaching pendant having a display function of a personal computer in a robot system combined with the personal computer.

To achieve the above object, according to the present invention, there is provided a robot teaching pendant used together with a robot controller and a personal computer for displaying a state of a robot and carrying out a robot teaching operation, which comprises emergency switch means connected to the robot controller for commanding emergency stop of the robot, display means connected to a graphical interface of the personal computer for inputting and displaying an image signal, and jog key switch means connected to a communication port of the personal computer for the inputting a command for teaching operation and the like.

According to the aforesaid arrangement, the robot teaching pendant includes all of the intrinsic functions thereof, and the display means itself can be also used as a display unit for the personal computer. Consequently, when operations such as a robot teaching operation and the like are carried out, it is possible to provide an easy to operate display screen using the graphical user interface of the personal computer.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the drawings.

Figure 1:
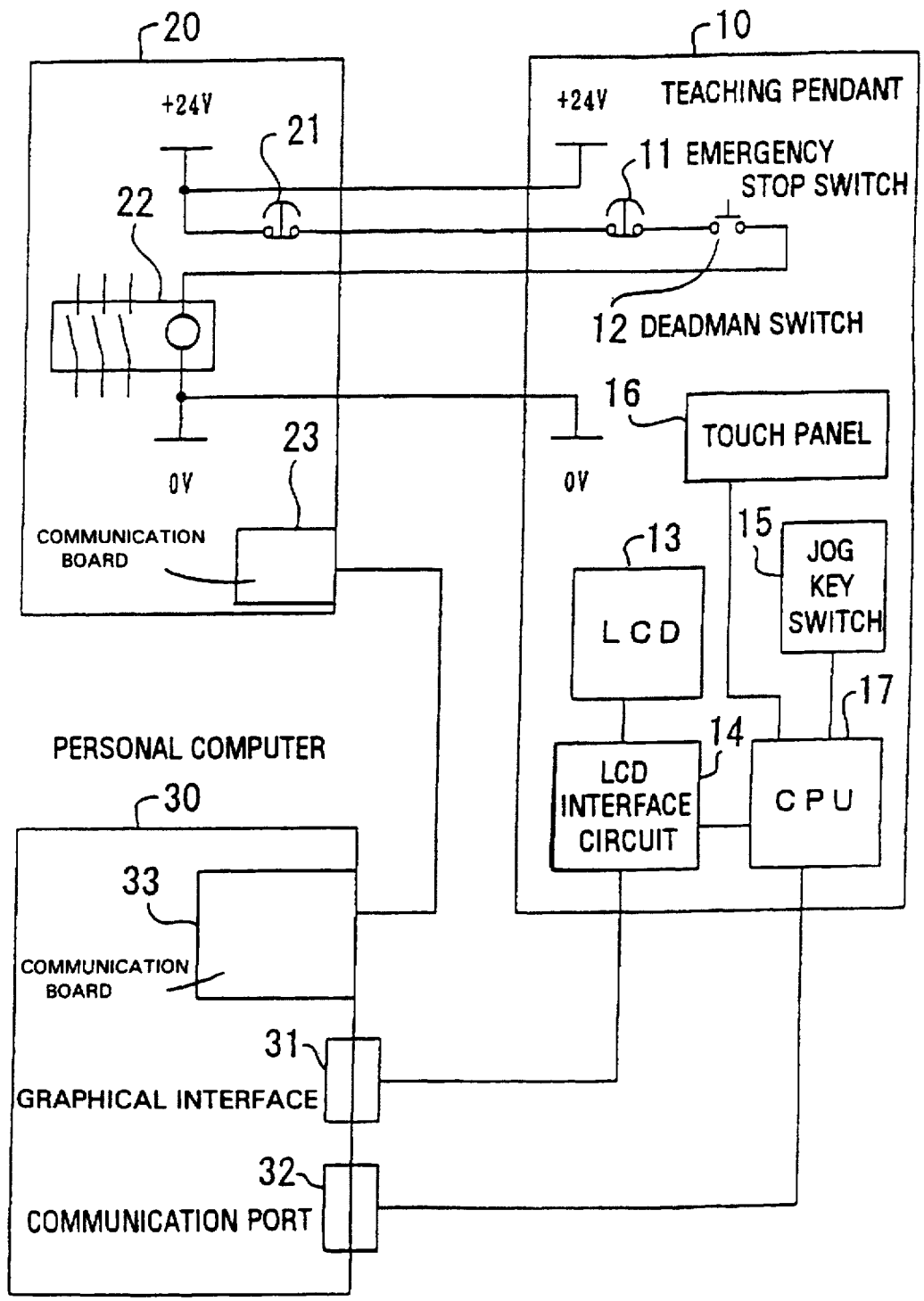
FIG. 1 is a schematic block diagram of a robot system to which a robot teaching pendant of the present invention is applied.

FIG. 1 is a schematic block diagram of a robot system to which a robot teaching pendant of the present invention is applied.

As shown in FIG. 1, the robot system includes a teaching pendant 10, a robot controller 20, and a personal computer 30 which are connected with each other, and a robot main body (not shown) connected to the robot controller 20.

The teaching pendant 10 includes an emergency stop switch 11 and a deadman switch 12 which are needed to secure the safety of an operator. The teaching pendant 10 also includes a liquid crystal display (LCD) unit 13 excellent in portability to display a screen of the personal computer 30 and operation of the robot controller 20. A liquid crystal display interface circuit 14 is connected to the liquid crystal display unit 13 to control it. The teaching pendant 10 further includes a jog key switch 15 and a touch panel 16 to carry out a teaching operation and the like. A processor (CPU) 17 is connected to the liquid crystal display interface circuit 14, the jog key switch 15 and the touch panel 16 to control them.

The robot controller 20 includes an emergency stop switch 21 and an emergency stop contactor 22. The emergency stop switch 21 is electrically connected to the emergency stop switch 11 and the deadman switch 12 on the teaching pendant 10 and the exciting coil of the emergency contactor 22 in series therewith. Each contact of the emergency stop contactor 22 is connected to the power of a servoamplifier (not shown) for controlling the servomotor of each axis of the robot main body. When operation for depressing the deadman switch 12 is stopped, or when any of the emergency stop switches 11 and 21 is depressed while the deadman switch 12 is depressed, a power to the servoamplifier is forcibly interrupted. Further, the robot controller 20 has a power supply line connected to the teaching pendant 10 to supply electric power for operating the processor 17 and the like of the teaching pendant 10 and electric power used for the backlight of the liquid crystal display unit 13 from the robot controller 20.

The personal computer 30 has a graphical interface 31 connected to the liquid crystal display interface circuit 14 of the teaching pendant 10 to supply an image signal from the personal computer 30 to the teaching pendant 10. The personal computer 30 has a communication port 32 connected to the processor 17 of the teaching pendant 10. Further, the personal computer 30 has a communication board 33 mounted on one of the expansion slots thereof and the communication board 33 is connected to a communication board 23 of the robot controller 20.

Since data must be transmitted between the robot controller 20 and the personal computer 30 at a high rate of speed, high speed serial communication is carried out using the communication board 23. On the other hand, since data transmitted between the personal computer 30 and the teaching pendant 10 is mainly signals supplied from the jog key switch 15 and the touch panel 16, the low speed communication port 32 is used.

When a cable connecting the personal computer 30 to the teaching pendant 10 has a length of several meters, an RS-232-C communication port of a serial interface standard is used as the communication port 32, whereas when the cable has a length exceeding 10 meters, an RS-422 communication port capable of increasing a transmission length is used.

The disposition of the teaching pendant 10 at a location where the personal computer 30 is disposed enables the teaching pendant 10 to be used as a display unit for creating a program for the robot and displaying a state of the robot. Further, the teaching pendant 10 includes functions necessary for robot teaching operations, i.e., the emergency stop button 11 and the deadman switch 12 for securing the safety of an operator, the jog key switch 15 for a teaching operation, the liquid display unit 13 for displaying information of the robot and input data, and the touch panel 16 for improving operability. Thus, the teaching pendant 10 is arranged to have not only safety but also operability and portability.

Since the liquid crystal display unit 13 of the teaching pendant 10 is also used as a display unit for the personal computer 30, an operating system employing a graphical user interface can be used as an operating system of the personal computer, so that it is made easy to observe and use a display screen and an amount of information to be displayed can be increased. Therefore, when a program of the robot is to be created, when a state of the robot is to be displayed or when a teaching operation is to be carried out, there can be constructed such an operation environment that operation is intuitively carried out in an easy to understand fashion with a picture or icon expressing a function displayed on a screen.

Figure 2:
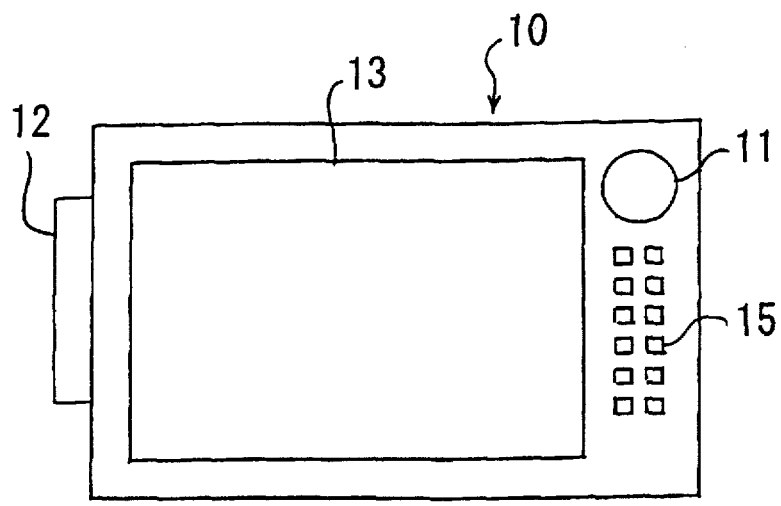
FIG. 2 is a front elevational view showing an example of the robot teaching pendant.

FIG. 2 is a front elevational view showing an example of the robot teaching pendant.

As shown in FIG. 2, the large-sized liquid crystal display unit 13 is mounted on the teaching pendant 10, and the display unit 13 can display a large amount of information including not only character information, but also graphic information in an easy to see fashion. The surface of the liquid crystal display unit 13 is covered with a transparent touch panel as an input unit on a screen. The emergency stop switch 11 and the jog key switch 15 are disposed on the front panel of the teaching pendant 10. The deadman switch 12 is disposed on a side of the teaching pendant 10.

Consequently, when the teaching pendant 10 is disposed in the vicinity of the personal computer 30, the teaching pendant 10 can be used as a usual display unit for the personal computer 30 to display a state of the robot, and the like. Further, since the teaching pendant 10 includes intrinsic functions for teaching a robot and is excellent in portability, a teaching operation can be easily carried out, and since a large amount of information can be displayed, operability is greatly improved.

As described above, according to the present invention, the robot teaching pendant is provided with the display unit capable of displaying an image signal of the personal computer, in addition to the emergency stop switch, deadman switch and the jog key switch. Therefore, it can permit the robot teaching pendant not only to graphically display a state of the robot and to create a program but also to carry out a teaching operation of the robot in the vicinity of the robot using the graphical user interface of the personal computer with safety and portability.

Note, although the display means includes a liquid crystal display unit as a preferable embodiment of the robot teaching pendant, other display means such as a plasma display unit and the like may be used.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A robot teaching pendant, used together with a robot controller and a personal computer having a communication port and a graphical interface, for displaying a state of a robot and carrying out a robot teaching operation, the robot teachinq pendant comprising:

emergency switch means, connected to said robot controller, for commanding an emergency stop of the robot;

display means, connected to the graphical interface of the personal computer, for inputting and displaying an image signal; and jog key switch means, connected to a communication port of the personal computer, for inputting a command for a teaching operation of the robot.

2. A robot teaching pendant according to claim 1, wherein said emergency switch means comprises an emergency stop switch and a deadman switch.

3. A robot teaching pendant according to claim 1, wherein said display means comprises a liquid crystal display unit and a liquid crystal display interface circuit.

4. A robot teaching pendant according to claim 1, further comprising a touch panel through which an input operation of the robot is carried out by touching a particular position on a screen of said display means.

5. A robot teaching pendant according to claim 1, wherein said display means receives the image signal from the graphical interface of the personal computer, to enable said display means to display images which are the same as those displayed on a display screen of the personal computer.

6. A robot teaching pendant according to claim 1, wherein a main body of the personal computer is disposed at a position different from that of the robot teaching pendant.

7. A robot system according to claim 5, wherein said emergency switch unit comprises an emergency stop switch and a deadman switch.

8. A robot system according to claim 5, further comprising a touch panel to perform input operations to control the robot by touch of a screen of said display unit.

9. A robot teaching pendant according to claim 5, wherein said display unit receives the image signal from the graphical user interface of said personal computer, to enable said display unit to display images which are the same as those displayed on a display screen of said personal computer.

10. A robot teaching pendant according to claim 5, wherein a main body of said personal computer is disposed at a position different from that of the robot teaching pendant.

11. A robot system for operating a robot, comprising:

a robot controller to control the operation of the robot;

a personal computer, having a graphical user interface, a communication board, and a communication port, said communication board being connected to said robot controller to perform high speed communication between said robot controller and said personal computer; and a robot teaching pendant, being external of said personal computer and said robot controller, to display a state of the robot and to perform a robot teaching operation, said robot teaching pendant comprising an emergency switch unit, connected to said robot controller, to control an emergency stop of the robot, a display unit, connected to said graphical user interface, to display first data generated by operation of said robot teaching pendant and second data received from said cathode ray tube interface, and a jog key switch, connected to said communication port, to input a teaching operation command for the robot.

\* \* \* \* \*